(12) United States Patent
Shen et al.

(10) Patent No.: US 12,120,569 B2
(45) Date of Patent: Oct. 15, 2024

(54) EFFICIENT NETWORK ACQUISITION SCANS

(71) Applicant: QUALCOMM Incorporated, San Diego, CA (US)

(72) Inventors: Xinning Shen, San Diego, CA (US); Qin Xue Frantti, San Diego, CA (US); Osama Lotfallah, San Diego, CA (US); Yong Xie, San Diego, CA (US); Sony Akkarakaran, Poway, CA (US); Arvind Vardarajan Santhanam, San Diego, CA (US); Reza Shahidi, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 348 days.

(21) Appl. No.: 17/661,138

(22) Filed: Apr. 28, 2022

(65) Prior Publication Data

US 2023/0354133 A1    Nov. 2, 2023

(51) Int. Cl.
*H04W 36/14* (2009.01)
*H04W 48/16* (2009.01)

(52) U.S. Cl.
CPC ........... *H04W 36/14* (2013.01); *H04W 48/16* (2013.01)

(58) Field of Classification Search
CPC .............................. H04W 36/14; H04W 48/16
See application file for complete search history.

(56) References Cited

U.S. PATENT DOCUMENTS

| 9,491,693 | B1 | 11/2016 | Chuttani et al. |
| 2013/0189985 | A1 | 7/2013 | Mutya et al. |
| 2016/0309400 | A1* | 10/2016 | Swaminathan ....... H04W 84/02 |

FOREIGN PATENT DOCUMENTS

WO    WO-2020239324 A1    12/2020

OTHER PUBLICATIONS

International Search Report and Written Opinion—PCT/US2023/063151—ISA/EPO—May 26, 2023.

* cited by examiner

*Primary Examiner* — Curtis B Odom
(74) *Attorney, Agent, or Firm* — QUALCOMM Incorporated

(57) ABSTRACT

Various aspects of the present disclosure generally relate to wireless communication. In some aspects, a user equipment (UE) may detect, while operating in an out-of-service (OOS) mode associated with a first network, that a second network satisfies one or more switching criteria. The UE may increase a time duration associated with a periodic network acquisition scan associated with the first network based at least in part on detecting that the second network satisfies the one or more switching criteria. The UE may switch, while operating in the OOS mode, from using the first network for connectivity to using the second network for connectivity based at least in part on detecting that the second network satisfies the one or more switching criteria. Numerous other aspects are described.

30 Claims, 9 Drawing Sheets

EFFICIENT NETWORK ACQUISITION SCANS

FIELD OF THE DISCLOSURE

Aspects of the present disclosure generally relate to wireless communication and to techniques and apparatuses for efficient network acquisition scans.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include detecting, while operating in an out-of-service (OOS) mode associated with a first network, that a second network satisfies one or more switching criteria. The method may include increasing a time duration associated with a periodic network acquisition scan associated with the first network based at least in part on detecting that the second network satisfies the one or more switching criteria. The method may include switching, while operating in the OOS mode, from using the first network for connectivity to using the second network for connectivity based at least in part on detecting that the second network satisfies the one or more switching criteria.

Some aspects described herein relate to a method of wireless communication performed by a UE. The method may include detecting, while connected to a first network, that a UE configuration associated with the UE satisfies one or more operating criteria. The method may include increasing a time duration associated with a periodic network acquisition scan associated with a second network based at least in part on detecting that the UE configuration satisfies the one or more operating criteria.

Some aspects described herein relate to a non-transitory computer-readable medium that stores a set of instructions for wireless communication by a UE. The set of instructions, when executed by one or more processors of the UE, may cause the UE to detect, while operating in an OOS mode associated with a first network, that a second network satisfies one or more switching criteria. The set of instructions, when executed by one or more processors of the UE, may cause the UE to increase a time duration associated with a periodic network acquisition scan associated with the first network based at least in part on detecting that the second network satisfies the one or more switching criteria. The set of instructions, when executed by one or more processors of the UE, may cause the UE to switch, while operating in the OOS mode, from using the first network for connectivity to using the second network for connectivity based at least in part on detecting that the second network satisfies the one or more switching criteria.

Some aspects described herein relate to a non-transitory computer-readable medium that stores a set of instructions for wireless communication by a one or more instructions that, when executed by one or more processors of a UE. The set of instructions, when executed by one or more processors of the one or more instructions that, when executed by one or more processors of a UE, may cause the one or more instructions that, when executed by one or more processors of a UE to detect, while connected to a first network, that a UE configuration associated with the UE satisfies one or more operating criteria. The set of instructions, when executed by one or more processors of the one or more instructions that, when executed by one or more processors of a UE, may cause the one or more instructions that, when executed by one or more processors of a UE to increase a time duration associated with a periodic network acquisition scan associated with a second network based at least in part on detecting that the UE configuration satisfies the one or more operating criteria.

Some aspects described herein relate to an apparatus for wireless communication. The apparatus may include means for detecting, while operating in an OOS mode associated with a first network, that a second network satisfies one or more switching criteria. The apparatus may include means for increasing a time duration associated with a periodic network acquisition scan associated with the first network based at least in part on detecting that the second network satisfies the one or more switching criteria. The apparatus may include means for switching, while operating in the OOS mode, from using the first network for connectivity to using the second network for connectivity based at least in part on detecting that the second network satisfies the one or more switching criteria.

Some aspects described herein relate to an apparatus for wireless communication. The apparatus may include means for detecting, while connected to a first network, that a UE configuration associated with the UE satisfies one or more operating criteria. The apparatus may include means for increasing a time duration associated with a periodic network acquisition scan associated with a second network based at least in part on detecting that the UE configuration satisfies the one or more operating criteria.

Some aspects described herein relate to an apparatus for wireless communication at a UE. The apparatus may include a memory and one or more processors coupled to the memory. The one or more processors may be configured to detect, while operating in an OOS mode associated with a first network, that a second network satisfies one or more switching criteria. The one or more processors may be configured to increase a time duration associated with a periodic network acquisition scan associated with the first network based at least in part on detecting that the second network satisfies the one or more switching criteria. The one or more processors may be configured to switch, while operating in the OOS mode, from using the first network for connectivity to using the second network for connectivity based at least in part on detecting that the second network satisfies the one or more switching criteria.

Some aspects described herein relate to an apparatus for wireless communication at a UE. The apparatus may include a memory and one or more processors coupled to the memory. The one or more processors may be configured to detect, while connected to a first network, that a UE configuration associated with the UE satisfies one or more operating criteria. The one or more processors may be configured to increase a time duration associated with a periodic network acquisition scan associated with a second network based at least in part on detecting that the UE configuration satisfies the one or more operating criteria.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
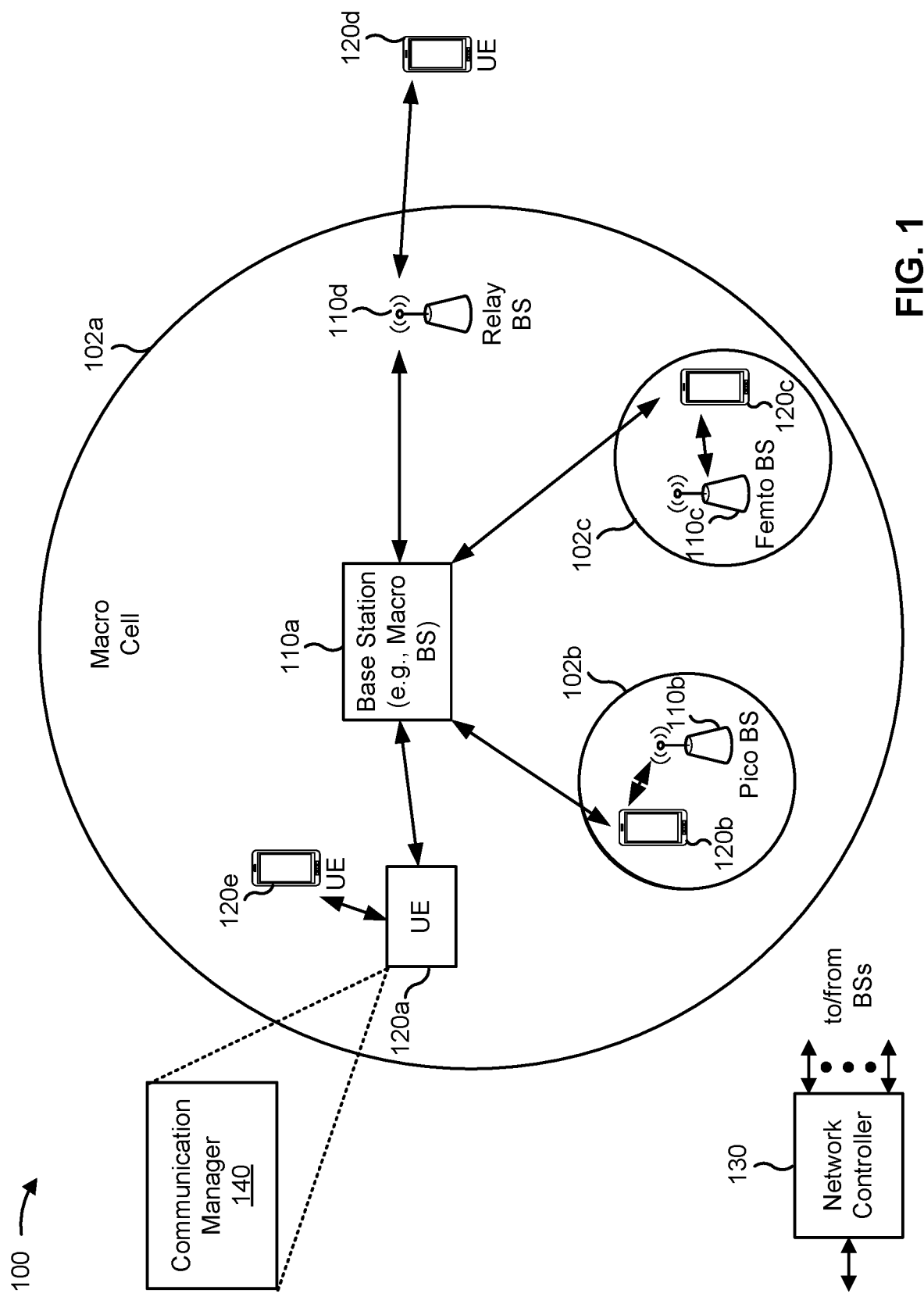
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network node" or "network entity" may refer to an aggregated base station, a disaggregated base station (e.g., described in connection with FIG. 9), an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IOT) devices, and/or may be implemented as NB-IOT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may detect, while operating in an out-of-service (OOS) mode associated with a first network, that a second network satisfies one or more switching criteria; increase a time duration associated with a periodic network acquisition scan associated with the first network based at least in part on detecting that the second network satisfies the one or more switching criteria; and switch, while operating in the OOS mode, from using the first network for connectivity to using the second network for connectivity based at least in part on detecting that the second network satisfies the one or more switching criteria. Additionally, or alternatively, the communication manager 140 may perform one or more other operations described herein.

In some aspects, the communication manager 140 may detect, while connected to a first network, that a UE configuration associated with the UE satisfies one or more operating criteria; and increase a time duration associated with a periodic network acquisition scan associated with a second network based at least in part on detecting that the UE configuration satisfies the one or more operating criteria. Additionally, or alternatively, the communication manager 140 may perform one or more other operations described herein.

As indicated above, FIG. 1 is provided as an example. Other examples may differ from what is described with regard to FIG. 1.

Figure 2:
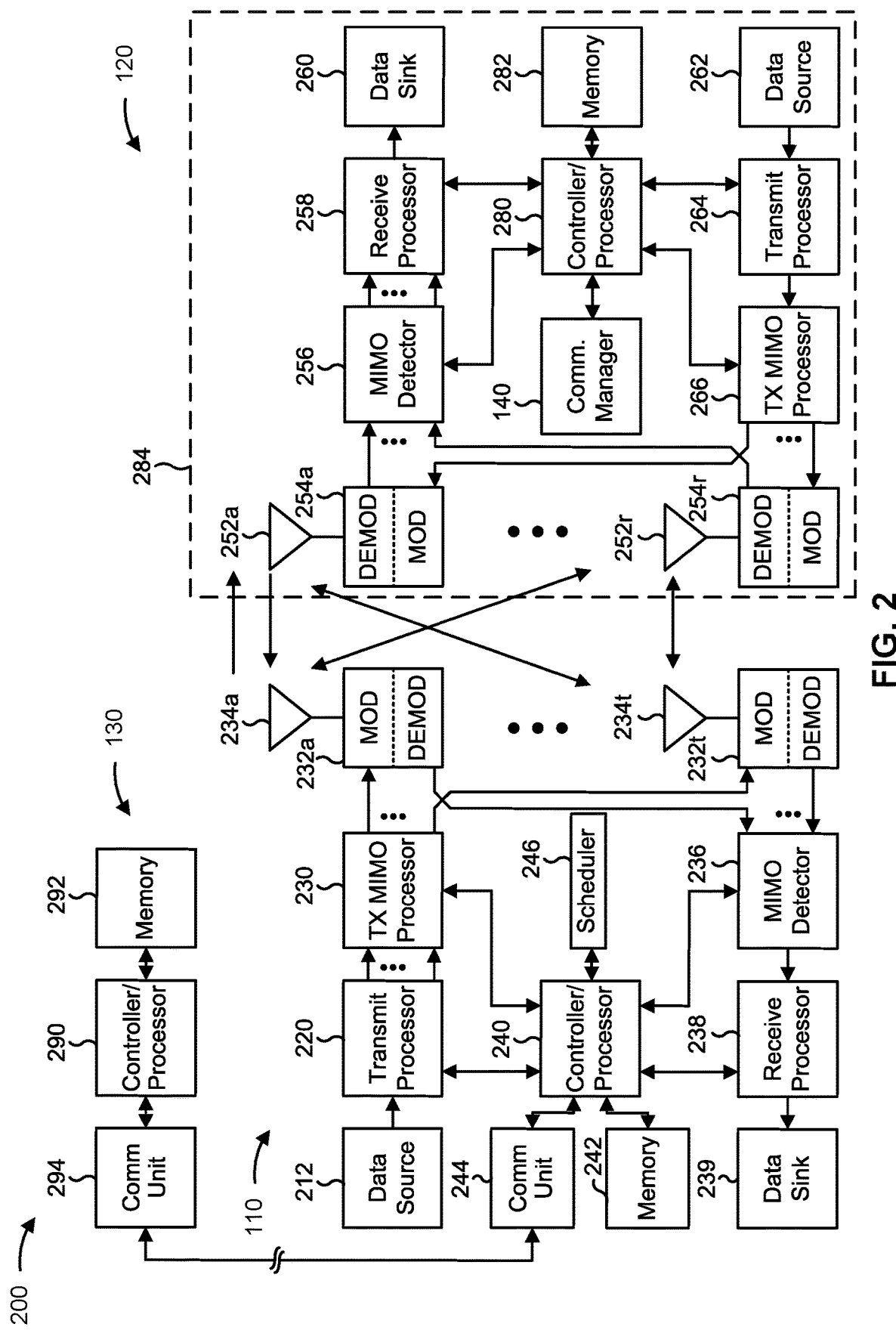
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-9).

The controller/processor 240 of the base station 110, the controller/processor 280 of the UE 120, and/or any other component(s) of FIG. 2 may perform one or more techniques associated with efficient network acquisition scans, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE includes means for detecting, while operating in an OOS mode associated with a first network, that a second network satisfies one or more switching criteria; means for increasing a time duration associated with a periodic network acquisition scan associated with the first network based at least in part on detecting that the second network satisfies the one or more switching criteria; and/or means for switching, while operating in the OOS mode, from using the first network for connectivity to using the second network for connectivity based at least in part on detecting that the second network satisfies the one or more switching criteria. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for detecting, while connected to a first network, that a UE configuration associated with the UE satisfies one or more operating criteria; and/or means for increasing a time duration associated with a periodic network acquisition scan associated with a second network based at least in part on detecting that the UE configuration satisfies the one or more operating criteria. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
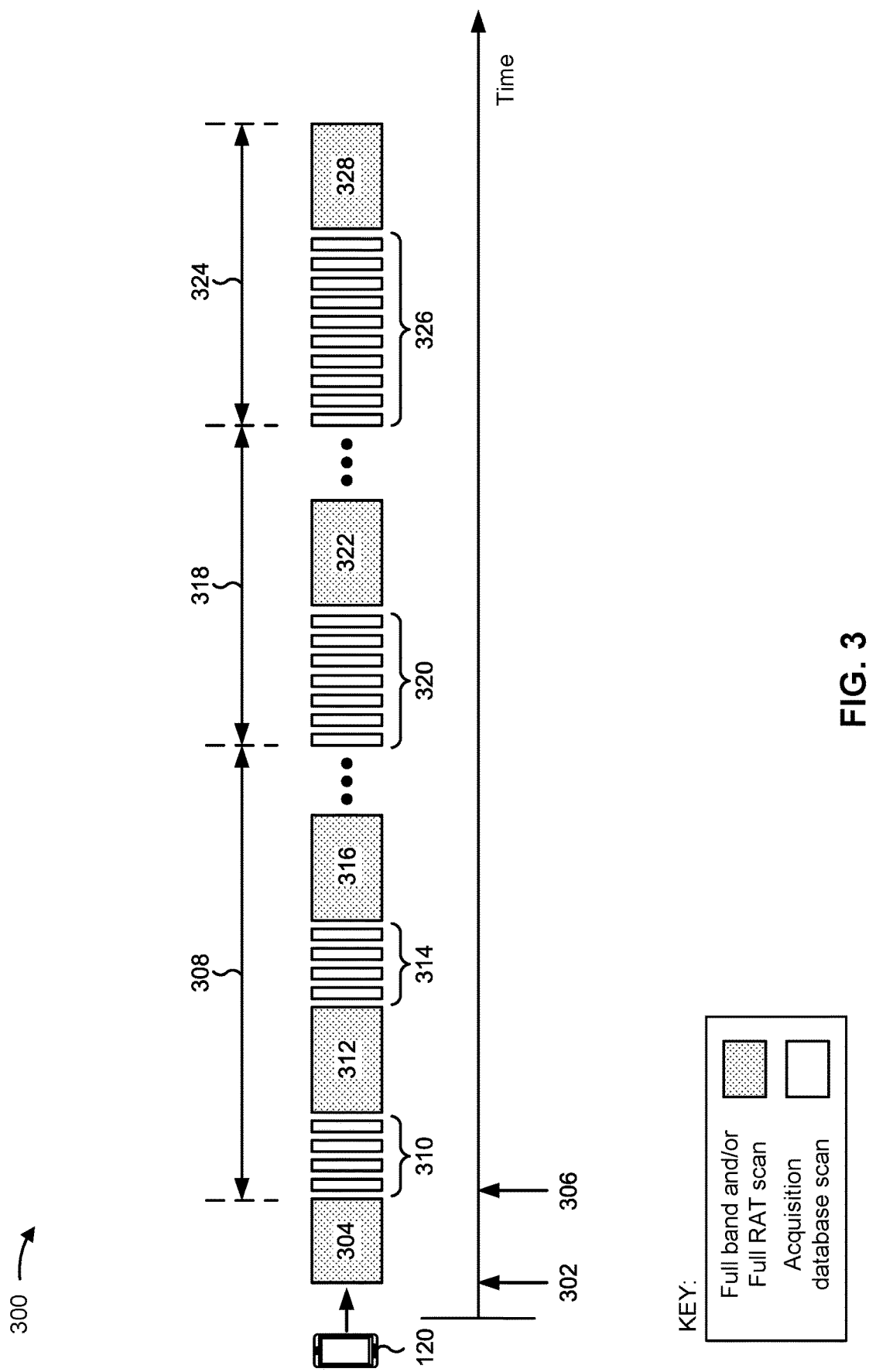
FIG. 3 is a diagram illustrating an example of a UE performing a network acquisition procedure, in accordance with the present disclosure.

FIG. 3 is a diagram illustrating an example 300 of a UE performing a network acquisition procedure, in accordance with the present disclosure.

A mobility of a UE (e.g., the UE 120) may result in the UE operating in and/or moving to a location with limited or no network coverage. As one example, a UE connected to a network (e.g., a wireless wide area network (WWAN) and/or a cellular network) may move to a location that includes an obstruction that blocks a wireless signal and causes the UE to lose access to a network. As another example, the obstruction may reduce a signal quality and cause the UE to connect to the network using a connection with reduced services relative to other connections. To illustrate, the connection may be an emergency connection that supports emergency calls (e.g., calls classified by the network as an emergency call) but lacks support for data services and/or non-emergency voice calls (e.g., calls classified by the network as a non-emergency call). In some aspects, the UE may perform a network acquisition procedure as further described below to gain access to a network (e.g., a cell acquisition procedure) and/or to switch network connections from a first connection with reduced services to a second connection with more services relative to the first connection (e.g., a reselection procedure). A network acquisition procedure may include the UE performing any combination of scans based at least in part on any combination of frequencies. A scan may denote the UE examining one or more frequencies by calculating a signal metric (e.g., RSRP or RSSI) based at least in part on a respective frequency and determining whether a signal is present at the respective frequency. As one example, the UE may determine whether the signal is present by determining whether the signal metric satisfies a power threshold. The presence of a signal may indicate, to the UE, a presence of a wireless network.

As shown by reference number 302, the UE 120 may transition to a first OOS mode based at least in part on losing access to a network, such as a WWAN. In some aspects, the first OOS mode may be a single RAT OOS mode associated with the UE 120 failing to gain access to a first WWAN (e.g., a cellular network) that is implemented based at least in part on a first RAT supported by the UE 120. While operating in the first OOS mode, the UE 120 may perform a network acquisition procedure that includes the UE 120 iteratively performing any combination of scans, such as an acquisition database scan, a full band scan, and/or a full RAT scan. An acquisition database scan may refer to a scan of a frequency (or a set of frequencies) of a cell on which the UE 120 was most recently camped (e.g., prior to losing a network connection). A full band scan may refer to a scan of all frequencies of a particular RAT (e.g., a RAT of a cell on which the UE 120 was most recently camped). A full RAT scan may refer to a scan of all frequencies of all RATs (e.g., all WWAN RATs) that the UE 120 supports (e.g., a 5G or NR RAT, a 4G or LTE RAT, and/or a CDMA RAT). In some aspects, the UE 120 may perform the scans in a particular order and/or a quantity of times as part of the network acquisition procedure. For example, an acquisition database scan may be performed multiple times between a full band scan. While the UE may perform at least part of the network acquisition procedure while operating in an OOS mode as shown in the example 300, in other examples, the UE 120 may perform the network acquisition procedure to switch from an existing connection to another connection (e.g., as part of a reselection procedure).

In the example 300, the UE 120 performs, after transitioning into the first OOS mode, a full scan 304, which may include the UE 120 performing a full band scan and/or a full RAT scan. Based at least in part on failing to acquire access to a network (e.g., a WWAN), the UE 120 may transition into a second OOS mode as shown by reference number 306. In some aspects, the second OOS mode may be a full RAT OOS mode. A full RAT OOS may denote that the UE 120 has failed to gain network access to any network that is implemented based at least in part on any RAT supported by the UE 120.

After performing the first full scan 304 and transitioning into the second OOS mode as shown by the reference number 306, the UE 120 may perform a first combination of scans associated with detecting one or more reference signals associated with a WWAN. In some aspects, the UE 120 may perform the first combination of scans for a first quantity of scan iterations (e.g., 10 iterations) as shown by reference number 308. To illustrate, the UE 120 may perform, as a first iteration of the first combination of scans, one or more acquisition database scans 310 and/or a full scan 312. For example, the UE 120 may perform a periodic acquisition database scan based at least in part on a first periodic time duration (e.g., every five seconds) until the UE 120 detects a reference signal associated with a WWAN or until the UE 120 performs a first quantity (shown as four in the example 300) of acquisition database scans. Alternatively or additionally, the UE 120 may perform the periodic acquisition database scan based at least in part on a second periodic time duration (e.g., 30 seconds or 45 seconds) associated with performing the full scan 312. Based at least in part on performing the first quantity of periodic acquisition database scans, failing to detect a reference signal, and/or the second periodic time duration, the UE 120 may perform, as part of the first combination of scans, the full scan 312. The UE 120 may iteratively perform the first combination of scans (e.g., the acquisition database scan(s) 310 and the full scan 312) until detecting a reference signal or completing the first quantity of scan iterations. To illustrate, and as shown by the example 300, the UE 120 may perform one or more acquisition database scans 314 and full scan 316 as a second iteration of performing the first combination of scans. While the example 300 shows the first combination of scans including four acquisition database scans and a full scan, other examples may include alternate or additional combinations of scans, scan execution orders, and/or periodic time durations.

In some aspects, and as shown by reference number 318, the UE 120 may iteratively perform a second combination of scans based at least in part on failing to detect a reference signal and/or obtaining access to a WWAN while performing the first combination of scans shown by the reference number 308. The UE 120 may use, as the second combination of scans, a different combination of scans relative to the first combination of scans. To illustrate, the UE 120 may perform one or more acquisition database scans 320 and a full scan 322, which may include a full band scan and/or a full RAT scan. As part of performing the acquisition database scans 320, the UE 120 may increase a quantity of periodic acquisition database scans performed (shown as seven) relative to the acquisition database scans 310. The UE 120 may perform the second combination of scans for a second quantity of scan iterations that may be a same quantity or different quantity from the first quantity. While the example 300 shows the second combination of scans including seven acquisition database scans and a full scan, other examples may include alternate or additional combinations of scans, scan execution orders, and/or periodic time durations.

As shown by reference number 324, the UE 120 may perform a third combination of scans based at least in part on failing to detect a reference signal and/or obtaining access to a WWAN after performing the second quantity of iterations associated with the second combination of scans. The third combination of scans may be different from the first combination and/or the second combination. As one example, the UE 120 may increase a quantity of periodic acquisition database scans performed as part of the third combination of scans relative to the first combination of scans and the second combination of scans. To illustrate, the third combination of scans includes one or more acquisition database scans 326 (shown as a quantity of 10 scans) and a full scan 328. The UE 120 may continue to perform the third combination of scans while operating in the OOS mode and/or the OOS full RAT mode and failing to detect a reference signal. In some aspects, the UE 120 may be positioned at a location that includes obstructions and/or has limited (or no) network coverage. At such a location, the UE 120 may perform iterative scans to detect a reference signal and/or gain access to the network, but may be unlikely to succeed, such as when the UE 120 is stationary. Accordingly, iteratively performing scans as part of the network acquisition procedure may quickly drain a battery of the UE 120 without providing benefit (e.g., without detecting a reference signal and/or obtaining access to a WWAN) to the UE 120.

Some techniques and apparatuses described herein provide enhanced network acquisition scans. In some aspects, a UE may detect, while operating in an OOS mode associated with a first network, that a second network satisfies one or more switching criteria. Alternatively or additionally, the UE may detect that the second network satisfies the one or more switching criteria while operating with a limited connection to the first network. In some aspects, the UE may perform a conditional network acquisition procedure based at least in part on detecting that the second network satisfies the one or more switching criteria. To illustrate, the UE may increase a time duration associated with performing a periodic network acquisition scan associated with the first network. Alternatively or additionally, the UE may reduce a number of frequencies scanned and/or may refrain from performing any scans as part of the conditional network acquisition procedure. Based at least in part on detecting that the second network satisfies the one or more switching criteria, the UE may switch, while operating in the OOS mode, from using the first network for connectivity to using the second network for connectivity.

In some aspects, a UE may detect, while connected to a first network, that a UE configuration associated with the UE satisfies one or more operating criteria. Based at least in part on detecting that the UE configuration satisfies the one or more operating criteria, the UE may perform a conditional network acquisition procedure, such as a conditional network acquisition procedure in which the UE may increase a time duration associated with a periodic network acquisition scan associated with a second network. Alternatively or additionally, the UE may reduce a number of frequencies scanned and/or may refrain from performing any scans as part of the conditional network acquisition procedure.

By performing the conditional network acquisition procedure (e.g., in place of a baseline network acquisition procedure), a UE 120 may mitigate battery drain and/or preserve a battery life of a battery powering the UE. In turn, the UE may extend an operating life of the UE and improve a user experience.

As indicated above, FIG. 3 is provided as an example. Other examples may differ from what is described with regard to FIG. 3.

Figure 4:
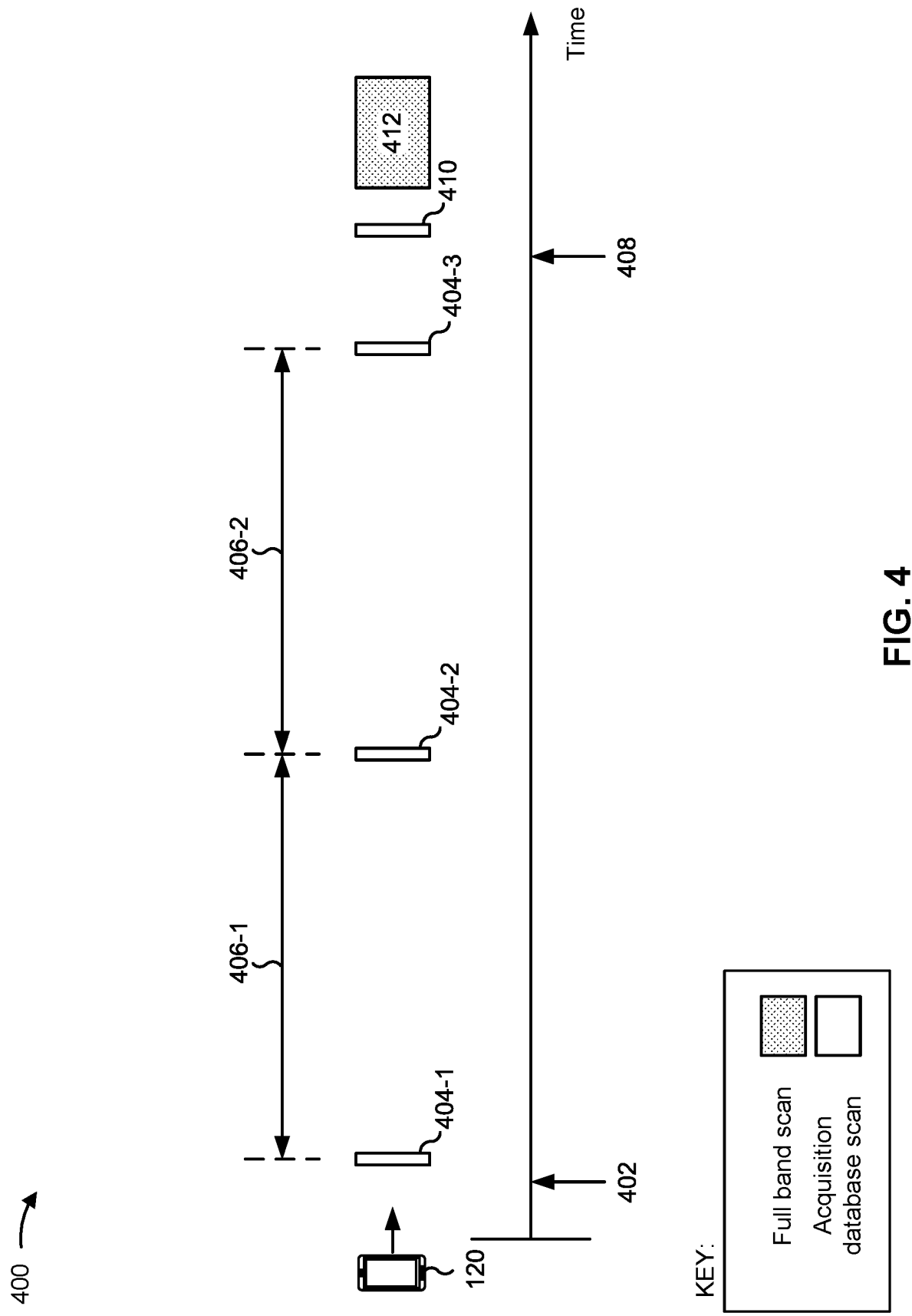
FIG. 4 is a diagram illustrating an example of a UE performing a network acquisition procedure, in accordance with the present disclosure.

FIG. 4 is a diagram illustrating an example 400 of a UE performing a network acquisition procedure, in accordance with the present disclosure.

The example 400 shows a network acquisition procedure that may be a conditional network acquisition procedure that is conditionally performed by the UE 120 based at least in part on one or more criteria. To illustrate, and as shown by reference number 402, the UE 120 may determine, while operating in an OOS mode with a first network, that a second network satisfies one or more switching criteria as further described with regard to FIG. 5. By validating the second network satisfies the one or more switching criteria while operating in the OOS mode, the UE 120 may switch to the second network to gain connectivity (e.g., access to a network). To illustrate, the UE 120 may switch to the second network by establishing a wireless connection to a second network entity associated with the second network. In some aspects, the first network may be a WWAN (e.g., a cellular network) and the second network may be a wireless local area network (WLAN), such as a wireless fidelity (WiFi) network. Alternatively or additionally, the UE 120 may determine that, while connected to the first network, the first network satisfies one or more operating criteria as further described with regard to FIG. 6. By validating the first network satisfies the one or more operating criteria while connected to the first network, the UE 120 may determine that a current connection with the first network satisfies a performance requirement. Because both scenarios may provide the UE 120 with connectivity to a network that satisfies the performance requirement of the UE, the UE 120 may perform the conditional network acquisition procedure, mitigate power drain at the UE, and preserve a battery life of the UE. For example, the conditional network acquisition procedure may be associated with performing one or more scans configured to detect a reference signal associated with a disconnected network entity (e.g., the first network entity when switching to the second network entity or the second network entity when the first network entity satisfies a performance requirement). Thus, the UE 120 may perform the conditional network acquisition procedure shown by the example 400 based at least in part on validating the first network satisfies the one or more operating criteria while connected to the first network and/or by validating a second network satisfies the one or more switching criteria while operating in an OOS mode associated with the first network.

In some aspects, the UE 120 may partially switch networks based at least in part on validating the second network satisfies the one or more switching criteria. As one example of partially switching networks, the UE 120 may maintain connectivity to the first network based at least in part on the first network providing a first communication service (e.g., a voice service or a data service) and switch from the first network to the second network for providing a second communication service (e.g., the data service or the voice service). In other examples, the UE 120 may fully switch networks (e.g., disconnect from the first network and connect to the second network) for all communication services.

As part of performing the conditional network acquisition procedure, the UE 120 may increase a time duration for performing a first periodic network acquisition scan relative to a baseline network acquisition procedure (e.g., shown in FIG. 3). Alternatively or additionally, the UE 120 may refrain from performing a second periodic network acquisition as part of performing the conditional network acquisition procedure. To illustrate, and as shown by the example 400, the UE 120 may perform a periodic acquisition database scan (shown as acquisition database scan 404-1, acquisition database scan 404-2, and acquisition database scan 404-3) based at least in part on the increased time duration (shown as increased time duration 406-1 and increased time duration 406-2) and may refrain from performing a full band and/or full RAT scan. Alternatively or additionally, the UE may disable one or more periodic network acquisition scans based at least in part on a movement of the UE satisfying a stationary threshold (e.g., a threshold that indicates the UE is stationary and/or the movement of the UE is less than a distance threshold), and a signal metric associated with the second network satisfying a performance threshold.

In some aspects, the UE 120 may increase the time duration associated with a periodic scan relative to an initial and/or baseline time duration. As one example, the UE 120 may increase the time duration of a periodic acquisition database scan from 5 seconds (e.g., for the baseline network acquisition procedure described with regard to FIG. 3) to 30 minutes. Alternatively or additionally, the UE 120 may decrease a quantity of periodic acquisition database scans performed by the UE 120. By increasing a time duration associated with a periodic network acquisition scan and/or reducing a quantity of periodic network acquisition scans performed, the UE 120 may reduce power consumption, mitigate battery drain, and/or extend a battery life at the UE 120.

The UE 120 may perform a periodic network acquisition scan (e.g., a full band scan and/or a full RAT scan) based at least in part on scanning a quantity of frequency bands or absolute radio frequency channel numbers (ARFCNs). In some aspects, the UE 120 may use, as the quantity, a reduced value of an initial and/or baseline quantity of the frequency bands or the ARFCNs. To illustrate, a full scan as described with regard to FIG. 3 may be considered an initial and/or baseline periodic network acquisition scan that the UE 120 performs based at least in part on scanning an initial and/or baseline quantity of frequency bands and/or ARFCNs. Based at least in part on performing a conditional network acquisition procedure, the UE 120 may scan fewer frequency bands and/or ARFCNs relative to the baseline quantity. By scanning fewer frequency bands and/or ARFCNs, the UE 120 may reduce power consumption, mitigate battery drain, and/or extend a battery life at the UE 120.

In some aspects, the UE 120 may select a frequency band and/or ARFCN to scan based at least in part on a deployment database. For example, the deployment database may include a list of one or more frequency bands and/or ARFCNs with historical success of reference signal (RS) detection by a UE (e.g., at a current location of the UE 120 and/or past historical success associated with the UE 120). Alternatively or additionally, the deployment database may be based at least in part on basic service set identifier (BSSID) information, such as BSSID information associated with the second network entity 503. By selecting a frequency band and/or ARFCN from a deployment database, the UE 120 may increase a probability of detecting a reference signal, gaining access to a network, and/or reduce a time delay associated with gaining access to the network.

As shown by reference number 408, the UE 120 may detect a trigger event that indicates to switch to an initial and/or baseline network acquisition procedure (e.g., as described with regard to FIG. 3). Switching to the baseline network acquisition procedure may include the UE 120 using an initial and/or baseline time duration for one or more periodic scans. As one example of a trigger event, the UE 120 may detect a movement of the UE satisfies a movement threshold (e.g., the UE 120 moves more than a particular distance). However, other examples of trigger events may include a signal metric associated with the second network failing to satisfy a performance threshold, support for the second network being disabled at the UE (e.g., WLAN support at the UE being disabled), the second network not supporting a particular communication service (e.g., a voice and data service), user interface (UI) activity at the UE, and/or a charging state of the UE being enabled.

Based at least in part on detecting the trigger event, the UE 120 may switch from performing the conditional network acquisition procedure (e.g., with the increased time durations and/or excluding the full band scan) to performing the baseline network acquisition procedure. To illustrate, and as shown by the example 400, the UE 120 may perform an acquisition database scan 410 based in part on decreasing the time duration (e.g., to the baseline time duration of 5 seconds) and/or may perform one or more additional scans (e.g., a full band scan 412). In some aspects, and based at least in part on detecting the trigger event, the UE 120 may switch from using the second network for connectivity (e.g., by disconnecting from the second network entity) to using the first network for connectivity (e.g., by establishing a connection to the first network entity) However, in some aspects, the UE 120 may disconnect from the second network entity without establishing a connection to the first network entity, such as when the UE 120 fails to detect a reference signal associated with the first network entity when performing the baseline network acquisition procedure.

In some aspects, a network recovery rate of the UE may be based at least in part on one or more periodic time durations used by the UE in a network acquisition procedure (e.g., a baseline network acquisition procedure and/or a conditional network acquisition procedure). For example, a first UE that performs a periodic scan every 5 seconds may detect a reference signal associated with a network at a faster rate relative to a second UE that performs the periodic scan every 30 minutes, based at least in part on the increased frequency of the scan at the first UE. However, the first UE may consume power at a faster rate relative to the second UE, based at least in part on the increased frequency of the scan the first UE. Thus, the first UE may increase battery drain and reduce a battery life relative to the second UE when both the first UE and the second UE are operating in an area with WLAN service and no WWAN service. By switching to the second network, the UE 120 may dynamically provide (alternative) connectivity to a user that may otherwise be unavailable and/or may require manual intervention from the user.

By increasing the time duration between scans of a periodic network acquisition scan, by refraining from performing additional network acquisition scans, and/or by reducing a quantity of frequencies and/or ARFCNs scanned, the UE 120 may reduce power consumption at the UE, mitigate power drain of a battery, and/or preserve a battery life of the battery. The preserved battery life may extend an operating life of the UE 120 and improve a user experience by enabling the user to interact with the UE 120 for a longer duration.

As indicated above, FIG. 4 is provided as an example. Other examples may differ from what is described with regard to FIG. 4.

Figure 5:
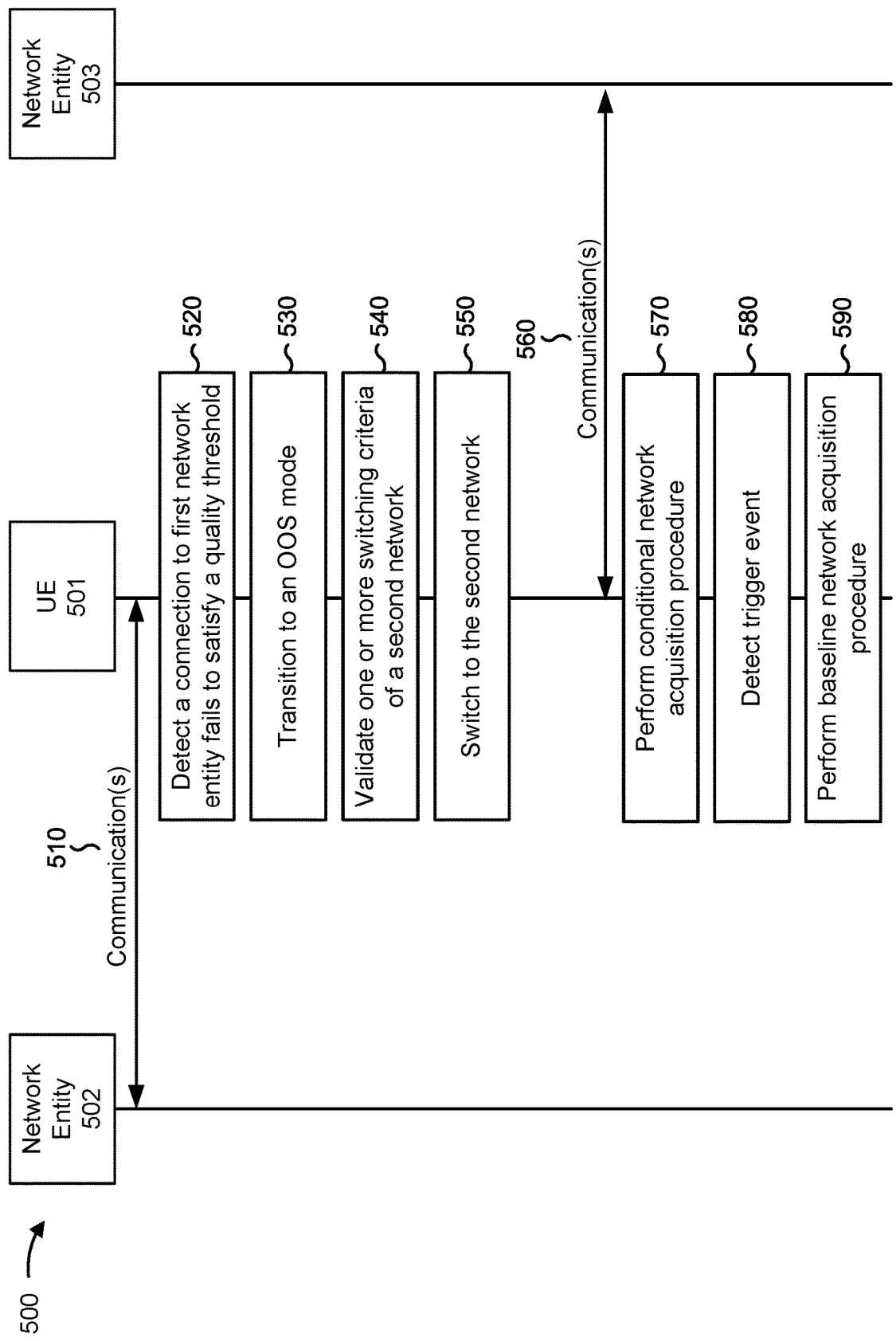
FIG. 5 is a diagram illustrating an example of a wireless communication process that may be performed, at least in part, by a UE, a first network entity, and/or a second network entity in a wireless communication network, in accordance with the present disclosure.

FIG. 5 is a diagram illustrating an example 500 of a wireless communication process that may be performed, at least in part, by a UE 501 (e.g., a UE 120 or an apparatus 900), a first network entity 502 (e.g., a base station 110), and/or a second network entity 503 (e.g., another base station 110) in a wireless communication network, in accordance with the present disclosure.

As shown by reference number 510, the UE 501 and the first network entity 502 may wirelessly communicate using a first network. As one example, the UE 501 may communicate with the first network entity 502 using, as the first network, a WWAN (e.g., a cellular network).

As shown by reference number 520, the UE 501 may detect that the connection to the first network entity 502 fails to satisfy a performance criterion. To illustrate, the UE 501 may fail to detect a periodic RS associated with the first network entity 502, such as by calculating a signal metric (e.g., RSRP, RSSI, RSRQ, and/or a CQI) that fails to satisfy a signal performance threshold. Alternatively or additionally, the UE 501 may determine that the connection to the first network entity 502 fails to provide a communication service associated with a performance requirement of the UE. For example, the UE 501 may determine that the connection may be restricted to emergency calls only, does not support data services, and/or does not support voice calls (e.g., other than calls classified by the first network as an emergency call).

As shown by reference number 530, the UE 501 may transition to an OOS mode, which may be a single RAT OOS mode or a full RAT OOS mode. To illustrate, and based at least in part on detecting that the connection to the first network entity fails to satisfy the performance criterion, the UE 501 may perform at least part of a baseline network acquisition procedure as further described with reference to FIG. 3 to identify another network with improved performance (e.g., an improved signal metric and/or more communication services) relative to the first network entity 502. While described as the UE 501 transitioning to an OOS mode, in other examples, the UE 501 may operate with a limited connection to the first network entity 502 (e.g., and not transition to an OOS mode), such as a connection that provides limited services as further described.

As shown by reference number 540, the UE 501 may validate one or more switching criteria of a second network associated with the second network entity 503. A switching criterion may denote a criterion that, when satisfied, may cause the UE 501 to switch connectivity from a first network to a second network. As one example, a switching criterion may be that a signal metric satisfying a performance threshold. To illustrate, the UE 501 may calculate a signal metric based at least in part on a signal from the second network entity 503 and validate whether the signal metric satisfies the performance threshold. As another example, a switching criterion may be that the second network entity 503 supports a particular communication service (e.g., a voice and data communication service), and the UE 501 may validate whether the second network supports the particular communication service.

In some aspects, a switching criterion may be associated with the UE 501 (e.g., a UE configuration and/or UE state). For instance, the switching criterion may be based at least in part on the UE 501 being stationary and/or a movement of the UE 501 satisfying a stationary threshold (e.g., the UE 501 moves less than a distance threshold). Validating whether the UE 501 is stationary and/or a movement of the UE satisfies the stationary threshold may indicate, to the UE 501, a decreased probability of detecting the RS associated with the first network entity 502. For example, when the UE 120 operates at a location associated with failing to detect the RS associated with the first network entity 502, the UE 120 may be less likely to detect the RS in subsequent network acquisition scans based at least in part on the UE 501 being stationary and continuing to operate at the location.

As other examples, the switching criterion may be associated with any combination of a switch setting, a screen state setting, and/or a charging state associated with the UE. A switch setting may indicate a user preference and/or manufacturing setting associated with switching networks and/or performing a conditional network acquisition scan. To illustrate, the UE 501 may receive user input that indicates to enable or disable switching between networks for connectivity (e.g., from a WWAN to a WLAN) based at least in part on the switching criteria. In some aspects, the user input may configure the switch setting. A screen state setting may indicate to conditionally enable switching between networks for connectivity, such as conditionally enable switching only when a screen and/or display is in an idle mode, power saving mode, and/or off mode. A charging state may be associated with a battery of the UE 501 (e.g., an enabled state indicates the battery is charging and a disabled state indicates the battery is not charging). The UE 501 may determine to enable switching between networks for connectivity based at least in part on the charging state being disabled. Alternatively or additionally, the UE 501 may disable switching between networks for connectivity based at least in part on the charging state being enabled.

In some aspects, the switching criterion may include the UE 501 operating in a notification suppression mode, such as a "do not disturb mode", a "driving mode", or a "nighttime" mode. The switching criterion may include a current time of day satisfying a time of day associated with low activity in the network and/or by the user. The time of day associated with low activity may be pre-configured (e.g., installed by a manufacturer), may be configured by a user (e.g., through a UI), and/or may be generated by the UE 501 based at least in part on a history of user input at the UE 501. The switching criterion may be based at least in part on a user activity metric (e.g., a quantity of user input detected over a time period) satisfying a user idle threshold.

As shown by reference number 550, the UE 501 may switch from using the first network entity 502 for connectivity to using the second network entity 503 for connectivity. As one example, as part of switching, the UE 501 may disconnect from the first network entity 502 (e.g., tear down a limited wireless connection to the first network entity 502) and/or cease scanning for a reference signal from the first network entity 502 (e.g., to establish a wireless connection to the first network entity 502). As another example, the UE 501 may partially switch networks for connectivity, such as by maintaining connectivity to the first network based at least in part on a first communication service (e.g., a voice service or a data service) and establishing connectivity to the second network based at least in part on second communication service (e.g., a data service or a voice service). Thus, the UE 501 may partially switch networks for providing a communication service. As part of switching, the UE 501 may establish a second wireless connection with the second network entity 503 and, thus, connect to the second network associated with the second network entity 503. In some aspects, the UE 501 may provide connectivity through the second network while concurrently displaying on a UE that service associated with the WWAN is unavailable (e.g., "No Service") and/or that the second UE has transitioned into a power saving mode.

As shown by reference number 560, the UE 501 may communicate with the second network entity 503 based at least in part on switching from using the first network entity for connectivity to the second network entity 503 for connectivity. While the UE 501 may switch from using the first network for connectivity to using the second network for connectivity based at least in part on the UE 501 being stationary (e.g., a movement of the UE 501 satisfying the stationary threshold and/or the movement of the UE satisfying the stationary threshold comprises the movement of the UE being less than a distance threshold.), in other examples, the UE 501 may switch from using the first network for connectivity to using the second network for connectivity independent of the UE being stationary.

As shown by reference number 570, the UE 501 may perform a conditional network acquisition procedure as further described with regard to FIG. 4. To illustrate, the UE 501 may increase a time duration for a first periodic network acquisition scan, refrain from performing a second periodic network acquisition scan, reduce a quantity of frequency bands and/or ARFCNs scanned, and/or refrain from performing any scans. To illustrate, the UE may disable one or more periodic network acquisition scans performed in the conditional network acquisition procedure based at least in part on a movement of the UE satisfying a stationary threshold, and a signal metric associated with the second network satisfying a performance threshold. In some aspects, the conditional network acquisition procedure may be associated with performing one or more scans configured to detect a reference signal associated with a disconnected network entity (e.g., the first network entity 502).

As shown by reference number 580, the UE 501 may detect a trigger event. In some aspects, detecting the trigger event may indicate, to the UE 501, to change from performing a conditional network acquisition procedure to performing a baseline network acquisition procedure. To illustrate, the UE 501 may calculate a signal metric associated with the second network and detect, as the trigger event, that the signal metric fails to satisfy a performance threshold. As another example, the UE 501 may receive input that, as the trigger event, disables support for the second network (e.g., disables support for WLAN) at the UE. In some aspects, the UE 501 may detect, as the trigger event, that the second network fails to support a particular communication service (e.g., a voice and data service). Alternatively or additionally, the UE 501 may detect, as the trigger event, that a movement of the UE satisfies a movement threshold that indicates the UE has transitioned from being stationary to mobile. In some aspects, the UE 501 may detect, as the trigger event, user interface activity (e.g., user input) at the UE 501 and/or a charging state of the UE being enabled.

As shown by reference number 590, the UE 501 may perform a baseline network acquisition procedure based at least in part on detecting the trigger event. Performing the baseline network acquisition procedure may include decreasing the time duration between periodic network acquisition scans from the increased time duration to the baseline time duration, performing a periodic network acquisition scan excluded from the conditional network acquisition scan, and/or increasing a quantity of frequency bands and/or ARFCNs scanned during a periodic network acquisition scan.

Dynamically switching between a baseline network acquisition procedure and a conditional network acquisition procedure may provide a UE with an ability to preserve a battery life based at least in part on the UE identifying when particular operating conditions (e.g., switching criterion) are present. In turn, the preserved battery life may extend an operating life of the UE and improve a user experience associated with the UE.

As indicated above, FIG. 5 is provided as an example. Other examples may differ from what is described with regard to FIG. 5.

Figure 6:
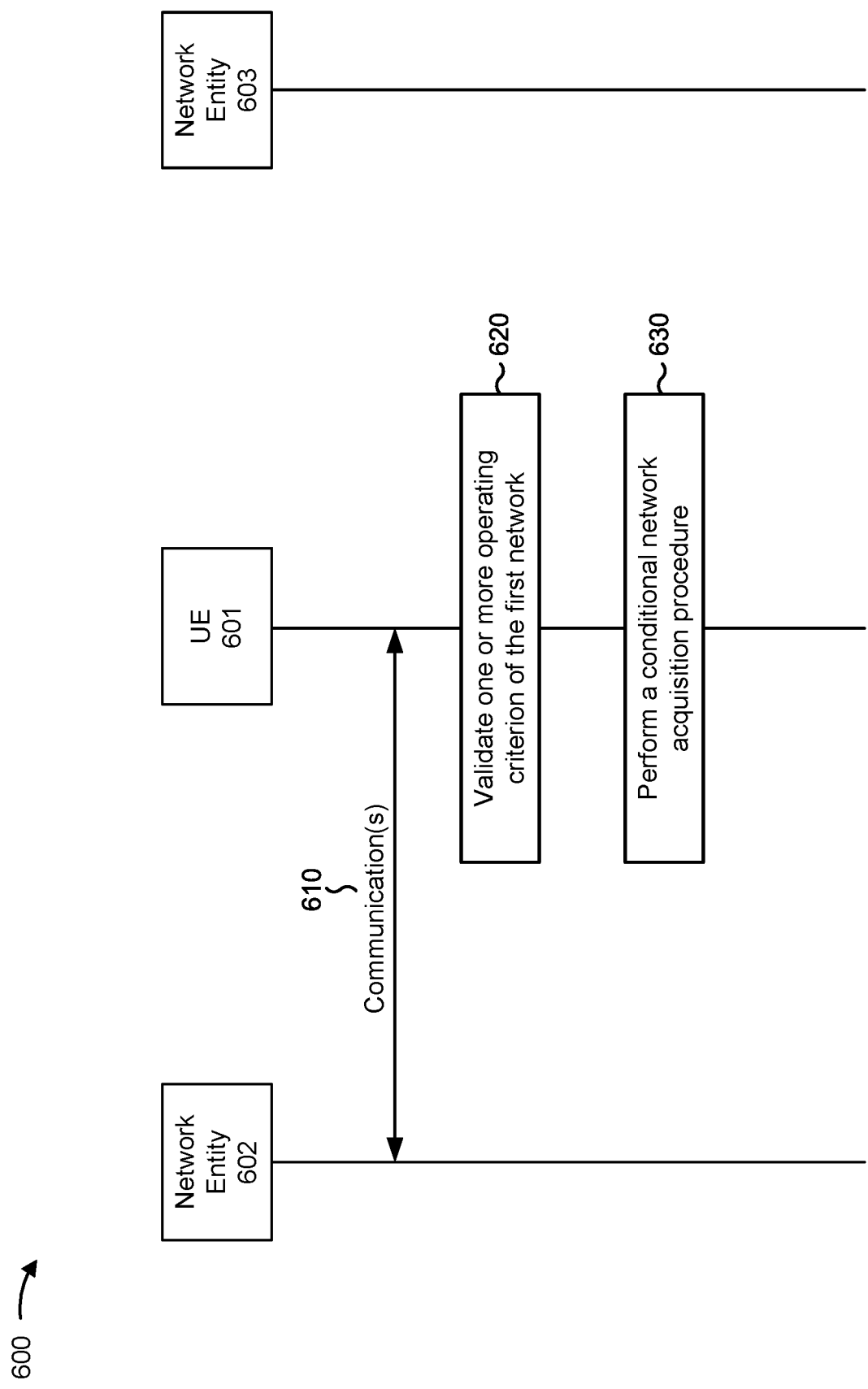
FIG. 6 is a diagram illustrating an example of a wireless communication process that may be performed, at least in part, by a UE and/or a first network entity in a wireless communication network, in accordance with the present disclosure.

FIG. 6 is a diagram illustrating an example 600 of a wireless communication process that may be performed, at least in part, by a UE 601 (e.g., a UE 120 or an apparatus 900) and/or a first network entity 602 (e.g., a base station 110) in a wireless communication network, in accordance with the present disclosure. In some aspects, the wireless communication process may be associated with detecting a presence of a second network entity 603 (e.g., another base station 110).

As shown by reference number 610, the UE 601 and the first network entity 602 may wirelessly communicate using a first network. As one example, the UE 601 may communicate with the first network entity 602 using, as the first network, a WWAN.

As shown by reference number 620, the UE 601 may validate one or more operating criteria associated with a first network associated with the first network entity 602. An operating criterion may denote a criterion that, when satisfied, may cause the UE 501 to perform a conditional network acquisition procedure instead of a baseline network acquisition procedure. As one example, the UE 601 may validate, as an operating criterion, that a UE preference setting indicates a preference for the first network. As another example, the UE 601 may validate, as an operating criterion, that a UE communication service plan associated with the first network satisfies a communication criterion. For example, the communication criterion may include that UE 601 is associated with an unlimited data plan (e.g., associated with the first network entity 602). In some aspects, the UE 601 may validate, as an operating condition, that the UE 601 has connectivity to the Ethernet and/or that the UE 601 does not have an enabled charging state.

As shown by reference number 630, the UE 601 may perform a conditional network acquisition procedure as further described with regard to FIG. 4. To illustrate, the UE 601 may increase a time duration for a first periodic network acquisition scan, refrain from performing a second periodic network acquisition scan, reduce a quantity of frequency bands and/or ARFCNs scanned, and/or refrain from performing any scans. In some aspects, the conditional network acquisition procedure may be associated with performing one or more scans configured to detect a reference signal associated with a disconnected network entity (e.g., the second network entity 603).

As indicated above, FIG. 6 is provided as an example. Other examples may differ from what is described with regard to FIG. 6.

Figure 7:
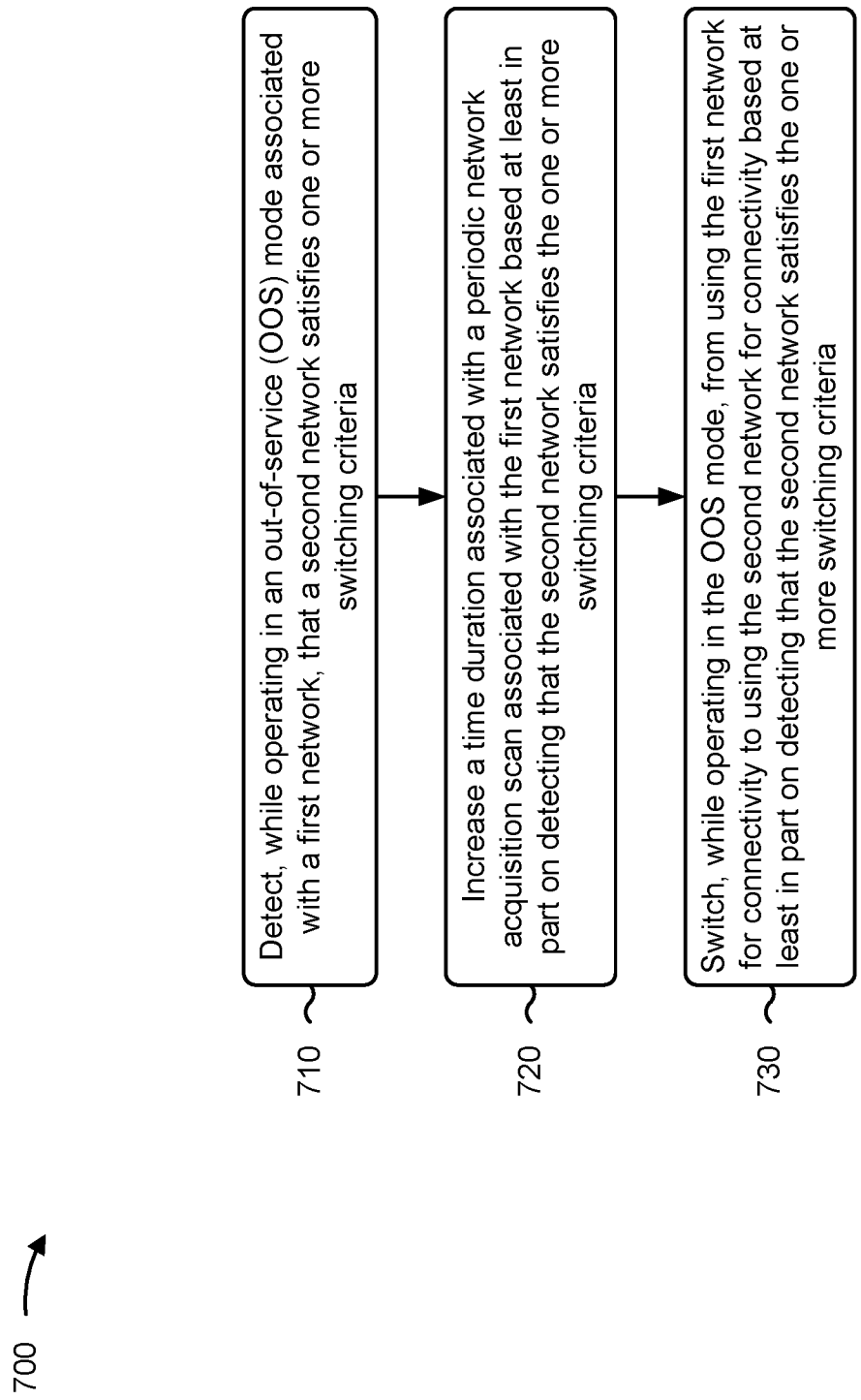
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with efficient network acquisition scans.

As shown in FIG. 7, in some aspects, process 700 may include detecting, while operating in an OOS mode associated with a first network, that a second network satisfies one or more switching criteria (block 710). For example, the UE (e.g., using communication manager 140 and/or network acquisition manager component 908, depicted in FIG. 9) may detect, while operating in an OOS mode associated with a first network, that a second network satisfies one or more switching criteria, as described above.

As further shown in FIG. 7, in some aspects, process 700 may include increasing a time duration associated with a periodic network acquisition scan associated with the first network based at least in part on detecting that the second network satisfies the one or more switching criteria (block 720). For example, the UE (e.g., using communication manager 140 and/or network acquisition manager component 908, depicted in FIG. 9) may increase a time duration associated with a periodic network acquisition scan associated with the first network based at least in part on detecting that the second network satisfies the one or more switching criteria, as described above.

As further shown in FIG. 7, in some aspects, process 700 may include switching, while operating in the OOS mode, from using the first network for connectivity to using the second network for connectivity based at least in part on detecting that the second network satisfies the one or more switching criteria (block 730). For example, the UE (e.g., using communication manager 140 and/or network acquisition manager component 908, depicted in FIG. 9) may switch, while operating in the OOS mode, from using the first network for connectivity to using the second network for connectivity based at least in part on detecting that the second network satisfies the one or more switching criteria, as described above. By performing the conditional network acquisition procedure (e.g., in place of a baseline network acquisition procedure), a UE may mitigate battery drain and/or preserve a battery life of a battery powering the UE. In turn, the UE may extend an operating life of the UE and improve a user experience.

Process 700 may include additional aspects, such as any single aspect or any combination of aspects described below and/or in connection with one or more other processes described elsewhere herein.

In a first aspect, the first network is a cellular network, and the second network is a WLAN (e.g., a WiFi network).

In a second aspect, process 700 includes communicating with the second network based at least in part on switching from the first network to the second network while operating in the OOS mode. By validating and switching to the second network while operating in an OOS mode associated with a first network, the UE may proactively gain connectivity and access to a network for communication.

In a third aspect, the one or more switching criteria comprise at least one of a signal metric associated with the second network satisfying a performance threshold, or the second network supporting a communication service. By validating the one or more switching criteria, the UE may identify a network that meets a performance requirement prior to switching networks such that the UE may provide a user with connectivity that meets the performance requirement.

In a fourth aspect, the communication service comprises a voice and data service.

In a fifth aspect, process 700 includes performing the periodic network ARFCNs.

In a sixth aspect, process 700 includes using, as the quantity, a reduced value of an initial quantity of the frequency bands or the ARFCNs, the initial quantity being associated with performing the periodic network acquisition scan prior to increasing the time duration. Reducing a quantity of frequency bands or ARFCNs scanned by the UE may preserve a battery life of the UE.

In a seventh aspect, process 700 includes selecting, as at least one of the quantity of frequency bands or ARFCNs, a frequency band or ARFCN based at least in part on a deployment database.

In an eighth aspect, the deployment database is based at least in part on BSSID information.

In a ninth aspect, switching from using the first network for connectivity to using the second network for connectivity is based at least in part on one or more of a switch setting, a screen state setting, or a charging state associated with the UE.

In a tenth aspect, process 700 includes disabling the periodic network acquisition scan based at least in part on a movement of the UE satisfying a stationary threshold, and a signal metric associated with the second network satisfying a performance threshold. A stationary threshold, in combination with the OOS mode, may indicate to the UE when acquiring a signal associated with the first network may be unlikely and help preserve computing resources (e.g., processing power, memory, battery life) for other task by reducing and or refraining from scanning for an unlikely signal.

In an eleventh aspect, alone or in combination with one or more of the first through tenth aspects, the movement of the UE satisfying the stationary threshold comprises the movement of the UE being less than a distance threshold.

In a twelfth aspect, alone or in combination with one or more of the first through eleventh aspects, process 700 includes switching from using the second network for connectivity to using the first network for connectivity based at least in part on detecting a trigger event.

In a thirteenth aspect, alone or in combination with one or more of the first through twelfth aspects, process 700 includes decreasing the time duration associated with the periodic network acquisition scan associated with the first network based at least in part on switching to using the first network for connectivity.

In a fourteenth aspect, alone or in combination with one or more of the first through thirteenth aspects, the trigger event comprises least one of a signal metric associated with the second network failing to satisfy a performance threshold, wirelessing local area network (WLAN) support at the UE being disabled, the second network not supporting a communication service, a movement of the UE satisfying a movement threshold, user interface activity, or a charging state of the UE being enabled.

In a fifteenth aspect, alone or in combination with one or more of the first through fourteenth aspects, switching from using the first network for connectivity to using the second network for connectivity further comprises switching from using the first network for connectivity to using the second network for connectivity independent of the UE being stationary.

In a sixteenth aspect, alone or in combination with one or more of the first through fifteenth aspects, switching from using the first network for connectivity to using the second network for connectivity is based at least in part on the UE operating in a notification suppression mode, a current time of day, or a user activity metric satisfying a user idle threshold.

In a seventeenth aspect, alone or in combination with one or more of the first through sixteenth aspects, process 700 includes performing, while operating in the OOS mode associated with the first network, a network acquisition procedure associated with the first network.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
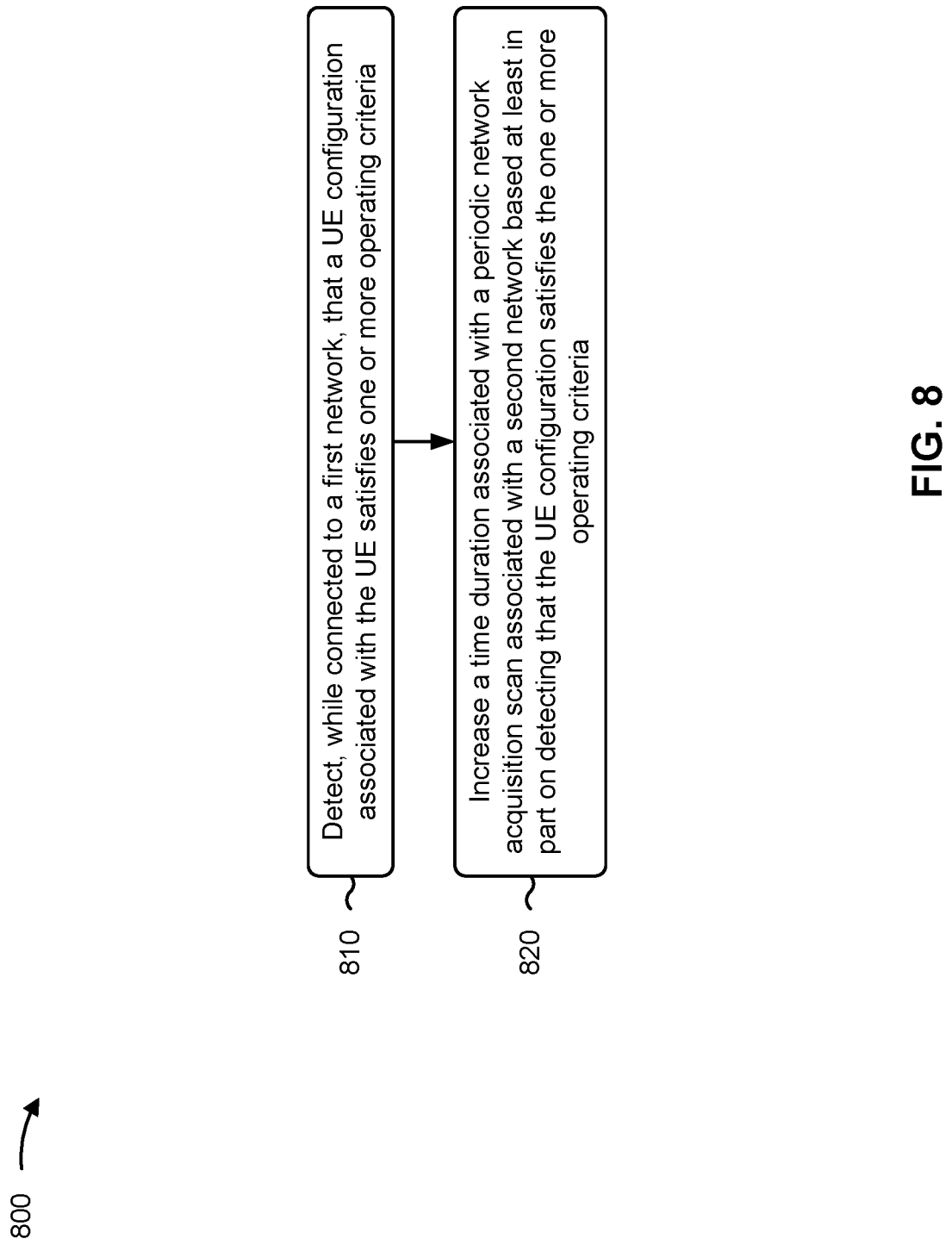
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with efficient network acquisition scans.

As shown in FIG. 8, in some aspects, process 800 may include detecting, while connected to a first network, that a UE configuration associated with the UE satisfies one or more operating criteria (block 810). For example, the UE (e.g., using communication manager 140 and/or network acquisition manager component 908, depicted in FIG. 9) may detect, while connected to a first network, that a UE configuration associated with the UE satisfies one or more operating criteria, as described above.

As further shown in FIG. 8, in some aspects, process 800 may include increasing a time duration associated with a periodic network acquisition scan associated with a second network based at least in part on detecting that the UE configuration satisfies the one or more operating criteria (block 820). For example, the UE (e.g., using communication manager 140 and/or network acquisition manager component 908, depicted in FIG. 9) may increase a time duration associated with a periodic network acquisition scan associated with a second network based at least in part on detecting that the UE configuration satisfies the one or more operating criteria, as described above. By performing the conditional network acquisition procedure (e.g., in place of a baseline network acquisition procedure) for the second (unconnected) network, a UE may mitigate battery drain and/or preserve a battery life of a battery powering the UE. In turn, the UE may extend an operating life of the UE and improve a user experience. By validating a UE configuration, the UE may identify when a current connection (e.g., the first network) may satisfy a performance requirement and enable to the UE to preserve computing resources by refraining from scanning for other networks that may not satisfy the performance requirement.

Process 800 may include additional aspects, such as any single aspect or any combination of aspects described below and/or in connection with one or more other processes described elsewhere herein.

In a first aspect, the first network is a cellular network, and the second network is a WLAN.

In a second aspect, the one or more operating criteria comprise at least one of a UE preference setting that indicates a preference for the first network, a UE communication service plan associated with the first network satisfies a communication criterion, or connectivity to Ethernet. Validating operating criteria of a network associated with a current connection enables the UE to identify when scanning for a second network may be unnecessary and further enable to the UE to preserve computing resources by refraining from performing additional scanning that may be unlikely to result in detecting a reference signal.

In a third aspect, the communication criterion comprises the UE being associated with an unlimited data plan.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
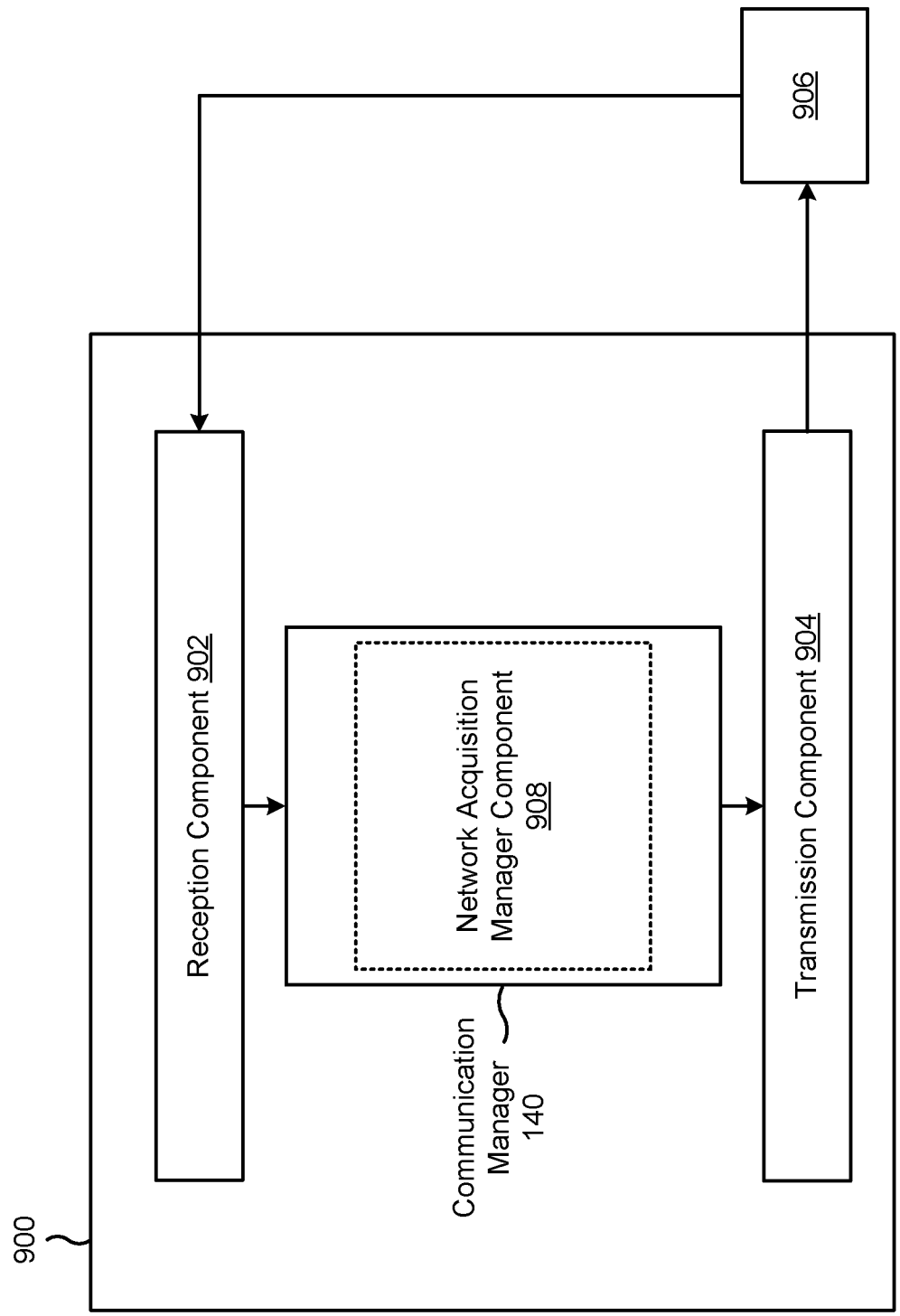
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of a network acquisition manager component 908, among other examples.

In some aspects, the apparatus 900 may be configured to perform one or more operations described herein in connection with FIGS. 3-8. Additionally, or alternatively, the apparatus 900 may be configured to perform one or more processes described herein, such as process 700 of FIG. 7, process 800 of FIG. 8, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The network acquisition manager component 908 may detect, while operating in an OOS mode associated with a first network, that a second network satisfies one or more switching criteria. The network acquisition manager component 908 may increase a time duration associated with a periodic network acquisition scan associated with the first network based at least in part on detecting that the second network satisfies the one or more switching criteria. The network acquisition manager component 908 may direct the apparatus to switch, while operating in the OOS mode, from using the first network for connectivity to using the second network for connectivity based at least in part on detecting that the second network satisfies the one or more switching criteria.

The communication manager 140 may communicate with the second network based at least in part on switching from the first network to the second network while operating in the OOS mode.

The network acquisition manager component 908 may perform the periodic network acquisition scan based at least in part on scanning a quantity of frequency bands or ARFCNs.

The network acquisition manager component 908 may use, as the quantity, a reduced value of an initial quantity of the frequency bands or the ARFCNs, the initial quantity being associated with performing the periodic network acquisition scan prior to increasing the time duration.

The network acquisition manager component 908 may select, as at least one of the quantity of frequency bands or ARFCNs, a frequency band or ARFCN based at least in part on a deployment database.

The network acquisition manager component 908 may disable the periodic network acquisition scan based at least in part on a movement of the UE satisfying a stationary threshold, and a signal metric associated with the second network satisfying a performance threshold.

The communication manager 140 may switch from using the second network for connectivity to using the first network for connectivity based at least in part on detecting a trigger event.

The network acquisition manager component 908 may decrease the time duration associated with the periodic network acquisition scan associated with the first network based at least in part on switching to using the first network for connectivity.

The network acquisition manager component 908 may perform a conditional network acquisition procedure while operating in an OOS mode.

The network acquisition manager component 908 may detect, while connected to a first network, that a UE configuration associated with the UE satisfies one or more operating criteria. The network acquisition manager component 908 may increase a time duration associated with a periodic network acquisition scan associated with a second network based at least in part on detecting that the UE configuration satisfies the one or more operating criteria.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: detecting, while operating in an out-of-service (OOS) mode associated with a first network, that a second network satisfies one or more switching criteria; increasing a time duration associated with a periodic network acquisition scan associated with the first network based at least in part on detecting that the second network satisfies the one or more switching criteria; and switching, while operating in the OOS mode, from using the first network for connectivity to using the second network for connectivity based at least in part on detecting that the second network satisfies the one or more switching criteria.

Aspect 2: The method of Aspect 1, wherein the first network is a cellular network, and the second network is a wireless local area network (WLAN).

Aspect 3: The method of Aspect 1 or Aspect 2, further comprising: communicating with the second network based at least in part on switching from the first network to the second network while operating in the OOS mode.

Aspect 4: The method of any one of Aspects 1-3, wherein the one or more switching criteria comprise at least one of: a signal metric associated with the second network satisfying a performance threshold, or the second network supporting a communication service.

Aspect 5: The method of Aspect 4, wherein the communication service comprises a voice and data service.

Aspect 6: The method of any one of Aspects 1-5 further comprising: performing the periodic network acquisition scan based at least in part on scanning a quantity of frequency bands or absolute radio frequency channel numbers (ARFCNs).

Aspect 7: The method of Aspect 6, further comprising: using, as the quantity, a reduced value of an initial quantity of the frequency bands or the ARFCNs, the initial quantity being associated with performing the periodic network acquisition scan prior to increasing the time duration.

Aspect 8: The method of Aspect 7, further comprising: selecting, as at least one of the quantity of frequency bands or ARFCNs, a frequency band or ARFCN based at least in part on a deployment database.

Aspect 9: The method of Aspect 8, wherein the deployment database is based at least in part on basic service set identifier (BSSID) information.

Aspect 10: The method of any one of Aspects 1-9, wherein switching from using the first network for connectivity to using the second network for connectivity is based at least in part on one or more of: a switch setting, a screen state setting, or a charging state associated with the UE.

Aspect 11: The method of any one of Aspects 1-5, further comprising: disabling the periodic network acquisition scan based at least in part on: a movement of the UE satisfying a stationary threshold, and a signal metric associated with the second network satisfying a performance threshold.

Aspect 12: The method of Aspect 11, wherein the movement of the UE satisfying the stationary threshold comprises the movement of the UE being less than a distance threshold.

Aspect 13: The method of any one of Aspects 1-12, further comprising: switching from using the second network for connectivity to using the first network for connectivity based at least in part on detecting a trigger event.

Aspect 14: The method of Aspect 13, further comprising: decreasing the time duration associated with the periodic network acquisition scan associated with the first network based at least in part on switching to using the first network for connectivity.

Aspect 15: The method of Aspect 13 or Aspect 14, wherein the trigger event comprises least one of: a signal metric associated with the second network failing to satisfy a performance threshold, wireless local area network (WLAN) support at the UE being disabled, the second network not supporting a communication service, a movement of the UE satisfying a movement threshold, user interface activity, or a charging state of the UE being enabled.

Aspect 16: The method of any one of Aspects 1-15, wherein switching from using the first network for connectivity to using the second network for connectivity further comprises: switching from using the first network for connectivity to using the second network for connectivity independent of the UE being stationary.

Aspect 17: The method of any one of Aspects 1-16, wherein switching from using the first network for connectivity to using the second network for connectivity is based at least in part on: the UE operating in a notification suppression mode, a current time of day, or a user activity metric satisfying a user idle threshold.

Aspect 18: The method of any one of Aspects 1-17, further comprising: performing, while operating in the OOS mode associated with the first network, a network acquisition procedure associated with the first network.

Aspect 19: A method of wireless communication performed by a user equipment (UE), comprising: detecting, while connected to a first network, that a UE configuration associated with the UE satisfies one or more operating criteria; and increasing a time duration associated with a periodic network acquisition scan associated with a second network based at least in part on detecting that the UE configuration satisfies the one or more operating criteria.

Aspect 20: The method of Aspect 19, wherein the first network is a cellular network, and the second network is a wireless local area network (WLAN).

Aspect 21: The method of Aspect 19 or Aspect 20, wherein the one or more operating criteria comprise at least one of: a UE preference setting that indicates a preference for the first network, a UE communication service plan associated with the first network satisfies a communication criterion, or connectivity to Ethernet.

Aspect 22: The method of Aspect 21, wherein the communication criterion comprises the UE being associated with an unlimited data plan.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
   detect, while operating in an out-of-service (OOS) mode associated with a first network, that a second network satisfies one or more switching criteria;
   increase a time duration associated with a periodic network acquisition scan associated with the first network based at least in part on detecting that the second network satisfies the one or more switching criteria; and
   switch, while operating in the OOS mode, from using the first network for connectivity to using the second network for connectivity based at least in part on detecting that the second network satisfies the one or more switching criteria.

2. The apparatus of claim 1, wherein the one or more processors are further configured to:
   communicate using the second network based at least in part on switching from the first network to the second network while operating in the OOS mode.

3. The apparatus of claim 1, wherein the one or more switching criteria comprise at least one of:
   a signal metric associated with the second network satisfying a performance threshold, or
   the second network supporting a communication service.

4. The apparatus of claim 1, wherein the one or more processors are further configured to:
   perform the periodic network acquisition scan based at least in part on scanning a quantity of frequency bands or absolute radio frequency channel numbers (ARFCNs).

5. The apparatus of claim 1, wherein switching from using the first network for connectivity to using the second network for connectivity is based at least in part on one or more of:
   a switch setting,
   a screen state setting, or
   a charging state associated with the UE.

6. The apparatus of claim 1, wherein the one or more processors are further configured to:
   disable the periodic network acquisition scan based at least in part on:
   a movement of the UE satisfying a stationary threshold, and
   a signal metric associated with the second network satisfying a performance threshold.

7. The apparatus of claim 6, wherein the movement of the UE satisfying the stationary threshold comprises the movement of the UE being less than a distance threshold.

8. The apparatus of claim 1, wherein the one or more processors are further configured to:
   switch from using the second network for connectivity to using the first network for connectivity based at least in part on detecting a trigger event.

9. The apparatus of claim 8, wherein the trigger event comprises least one of:
   a signal metric associated with the second network failing to satisfy a performance threshold,
   wireless local area network (WLAN) support at the UE being disabled,
   the second network not supporting a communication service,
   a movement of the UE satisfying a movement threshold,
   user interface activity, or
   a charging state of the UE being enabled.

10. The apparatus of claim 1, wherein switching from using the first network for connectivity to using the second network for connectivity is based at least in part on:
    the UE operating in a notification suppression mode,
    a current time of day, or
    a user activity metric satisfying a user idle threshold.

11. The apparatus of claim 1, wherein the one or more processors are further configured to:
    perform, while operating in the OOS mode associated with the first network, a network acquisition procedure associated with the first network.

12. An apparatus for wireless communication at a user equipment (UE), comprising:
    a memory; and
    one or more processors, coupled to the memory, configured to:
    detect, while connected to a first network, that a UE configuration associated with the UE satisfies one or more operating criteria; and
    increase a time duration associated with a periodic network acquisition scan associated with a second network based at least in part on detecting that the UE configuration satisfies the one or more operating criteria.

13. The apparatus of claim 12, wherein the first network is a cellular network, and the second network is a wireless local area network (WLAN).

14. The apparatus of claim 12, wherein the one or more operating criteria comprise at least one of:
    a UE preference setting that indicates a preference for the first network,
    a UE communication service plan associated with the first network satisfies a communication criterion, or
    connectivity to Ethernet.

15. The apparatus of claim 12, wherein the one or more operating criteria comprises the UE being associated with an unlimited data plan.

16. A method of wireless communication performed by a user equipment (UE), comprising:
    detecting, while operating in an out-of-service (OOS) mode associated with a first network, that a second network satisfies one or more switching criteria;
    increasing a time duration associated with a periodic network acquisition scan associated with the first network based at least in part on detecting that the second network satisfies the one or more switching criteria; and
    switching, while operating in the OOS mode, from using the first network for connectivity to using the second network for connectivity based at least in part on detecting that the second network satisfies the one or more switching criteria.

17. The method of claim 16, further comprising:
    communicating using the second network based at least in part on switching from the first network to the second network while operating in the OOS mode.

18. The method of claim 16, wherein the one or more switching criteria comprise at least one of:
    a signal metric associated with the second network satisfying a performance threshold, or
    the second network supporting a communication service.

19. The method of claim 16, further comprising:
    performing the periodic network acquisition scan based at least in part on scanning a quantity of frequency bands or absolute radio frequency channel numbers (ARFCNs).

20. The method of claim 16, wherein switching from using the first network for connectivity to using the second network for connectivity is based at least in part on one or more of:
    a switch setting,
    a screen state setting, or
    a charging state associated with the UE.

21. The method of claim 16, further comprising:
    disabling the periodic network acquisition scan based at least in part on:
    a movement of the UE satisfying a stationary threshold, and
    a signal metric associated with the second network satisfying a performance threshold.

22. The method of claim 21, wherein the movement of the UE satisfying the stationary threshold comprises the movement of the UE being less than a distance threshold.

23. The method of claim 16, further comprising:
    switching from using the second network for connectivity to using the first network for connectivity based at least in part on detecting a trigger event.

24. The method of claim 23, wherein the trigger event comprises least one of:
    a signal metric associated with the second network failing to satisfy a performance threshold,
    wireless local area network (WLAN) support at the UE being disabled,
    the second network not supporting a communication service,
    a movement of the UE satisfying a movement threshold,
    user interface activity, or
    a charging state of the UE being enabled.

25. The method of claim 16, wherein switching from using the first network for connectivity to using the second network for connectivity is based at least in part on:
- the UE operating in a notification suppression mode,
- a current time of day, or
- a user activity metric satisfying a user idle threshold.

26. The method of claim 16, further comprising:
- performing, while operating in the OOS mode associated with the first network, a network acquisition procedure associated with the first network.

27. A method of wireless communication performed by a user equipment (UE), comprising:
- detecting, while connected to a first network, that a UE configuration associated with the UE satisfies one or more operating criteria; and
- increasing a time duration associated with a periodic network acquisition scan associated with a second network based at least in part on detecting that the UE configuration satisfies the one or more operating criteria.

28. The method of claim 27, wherein the first network is a cellular network, and the second network is a wireless local area network (WLAN).

29. The method of claim 27, wherein the one or more operating criteria comprise at least one of:
- a UE preference setting that indicates a preference for the first network,
- a UE communication service plan associated with the first network satisfies a communication criterion, or
- connectivity to Ethernet.

30. The method of claim 27, wherein the one or more operating criteria comprises the UE being associated with an unlimited data plan.

* * * * *